US009758424B2

(12) United States Patent
Inaba et al.

(10) Patent No.: US 9,758,424 B2
(45) Date of Patent: Sep. 12, 2017

(54) ANISOTROPIC GLASS

(71) Applicant: ASAHI GLASS COMPANY, LIMITED, Chiyoda-ku (JP)

(72) Inventors: Seiji Inaba, Tokyo (JP); Setsuro Ito, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/168,613

(22) Filed: May 31, 2016

(65) Prior Publication Data

US 2016/0362328 A1 Dec. 15, 2016

(30) Foreign Application Priority Data

Jun. 11, 2015 (JP) ................................ 2015-118654

(51) Int. Cl.
*C03C 3/16* (2006.01)
*C03C 3/17* (2006.01)

(52) U.S. Cl.
CPC . *C03C 3/17* (2013.01); *C03C 3/16* (2013.01)

(58) Field of Classification Search
CPC .... C03C 3/16; C03C 3/17; C03C 3/19; C03C 3/21
See application file for complete search history.

(56) References Cited

U.S. PATENT DOCUMENTS 9,302,932 B2 * 4/2016 Kim .......................... C03C 3/21
2013/0299483 A1 * 11/2013 Kim .......................... C03C 3/21 219/391

OTHER PUBLICATIONS

Seiji Inaba, et al., "Entropic shrinkage of an oxide glass", Nature materials, vol. 14, 2015, 14 pgs.

* cited by examiner

*Primary Examiner* — Karl Group
(74) *Attorney, Agent, or Firm* — Oblon, McClelland, Maier & Neustadt, L.L.P.

(57) ABSTRACT

The present invention relates to an anisotropic glass containing, in terms of mol % on the basis of oxides, $P_2O_5$ in a content of from 45 mol % to 57 mol %, two or more kinds of alkali metal oxides selected from the group consisting of $Li_2O$, $Na_2O$, $K_2O$, $Rb_2O$, and $Cs_2O$ in a total content of from 30 mol % to 54 mol %, and at least one polyvalent element oxide other than $P_2O_5$ in a total content of from 0.1 mol % to 20 mol %, and having a birefringence of $30\times10^{-6}$ or more.

16 Claims, No Drawings

ANISOTROPIC GLASS

FIELD OF THE INVENTION

The present invention relates to an anisotropic glass showing entropic elasticity.

BACKGROUND ART OF THE INVENTION

In general, glass is an isotropic amorphous inorganic oxide material. However, Non-Patent Document 1 discloses that when a mixed alkali metaphosphate glass having a specific composition is elongated in one axial direction, an anisotropic glass having an extremely large birefringence is obtained. Non-Patent Document 1 further discloses that the anisotropic glass shows entropic elasticity. The entropic elasticity used herein is a property that restoring force is developed in order that molecules arranged regularly due to external force return to original irregular state according to a law of entropy increase, and is characteristic property of rubber.

Various applications are expected to the anisotropic glass having such a characteristic.

Non-Patent Document 1: Nature Materials Vol. 14, pp 312-317 (2015)

SUMMARY OF THE INVENTION

However, the anisotropic glass disclosed in Non-Patent Document 1 is poor in water resistance. The present invention has an object to provide an anisotropic glass having a high water resistance.

The present invention provides an anisotropic glass containing, in terms of mol % on the basis of oxides, $P_2O_5$ in a content of from 45 mol % to 57 mol %, two or more kinds of alkali metal oxides selected from the group consisting of $Li_2O$, $Na_2O$, $K_2O$, $Rb_2O$, and $Cs_2O$ in a total content of from 30 mol % to 54 mol %, and at least one polyvalent element oxide other than $P_2O_5$ in a total content of from 0.1 mol % to 20 mol %, and having a birefringence of $30\times10^{-6}$ or more.

According to the present invention, an anisotropic glass having a high water resistance can be provided.

MODE FOR CARRYING OUT THE INVENTION

In the present description, components of glass are represented by representative oxides such as $P_2O_5$ and $Na_2O$. Furthermore, the content (glass composition) of each component to the entire glass is represented by mol % on the basis of oxides.

An anisotropic glass is a glass showing a birefringence. Specifically, it is a glass in which coloration is observed when observed under a polarizing microscope.

In the present description, a glass transition point Tg is a value measured by using a differential thermal analyzer (DTA).

The anisotropic glass of the present invention (hereinafter referred to the "present glass") contains $P_2O_5$ in a content of from 45 mol % to 57 mol %, and two or more kinds of alkali metal oxides selected from the group consisting of $Li_2O$, $Na_2O$, $K_2O$, $Rb_2O$ and $Cs_2O$ in a total content of from 30 mol % to 54 mol %, and further contains other polyvalent element oxides in a total content of from 0.1 mol % to 20 mol %. The glass having such a composition (hereinafter referred to as the "present glass composition") easily provides an anisotropic glass having a large birefringence by elongating the glass in one axial direction.

The birefringence of the present glass is $30\times10^{-6}$ or more, and large entropic elasticity can be obtained as anisotropy is large. The birefringence of the present glass is preferably $40\times10^{-6}$ or more, and more preferably $70\times10^{-6}$ or more.

In the following description, mol % is simply described as %.

In the present glass composition, $P_2O_5$ is a component to form a network of a glass structure, and is an essential component. It is considered that the present glass has a chain structure formed from $PO_4$ tetrahedron. In the present glass composition, the content of $P_2O_5$ is 45% or more, preferably 48% or more and more preferably 49% or more, in order to form a chain structure. The content of $P_2O_5$ is 57% or less, preferably 55% or less and more preferably 52% or less, in order to stabilize the chain structure.

The present glass composition contains alkali metal oxides selected from the group consisting of $Li_2O$, $Na_2O$, $K_2O$, $Rb_2O$, and $Cs_2O$ in a total content of from 30 mol % to 54 mol %. In general, it is considered that in a metaphosphate glass having a content of $P_2O_5$ of around 50%, a plurality of chain structures each formed from $PO_4$ tetrahedron are present, and cations present between the chains are coordinated to oxygen ions constituting the chains. In the present glass, alkali metal ions are coordinated between the chains, each formed from $PO_4$ tetrahedron. An alkali metal ion has a small electric field intensity and a small electronegativity. Therefore, it is considered that bonding strength between the alkali metal ion and an oxygen ion is small. In the present glass, linear chains formed from $PO_4$ tetrahedron are bonded to each other by relatively weak bonding strength through alkali metal ions. Therefore, when the present glass is elongated axially in one direction, each linear chain is easy to be oriented in one axial direction, and anisotropy tends to be enhanced. The electric field intensity used herein is represented by a value obtained by dividing a valence of a cation by the square of a cationic radius.

The content of the alkali metal oxides in the present glass composition is 30% or more, preferably 35% or more, and more preferably 40% or more, in total, in order to enhance anisotropy. The content of the alkali metal oxides is 54% or less, preferably 50% or less, and more preferably 49% or less, in total, in order to enhance water resistance.

The present glass contains two or more kinds selected from the group (alkali metal oxides) consisting of $Li_2O$, $Na_2O$, $K_2O$, $Rb_2O$, and $Cs_2O$. The present glass contains two or more kinds, preferably three or more kinds, and more preferably four or more kinds, of alkali metal oxides in order to enhance anisotropy. In the present glass, anisotropy tends to be enhanced as the kind of alkali metal oxides contained is increased. The reason for this is considered that the probability of the different alkali metal ions being adjacently present in a glass structure becomes high, and thereby a chain structure is more flexible. In a portion where different cations are adjacently present, an oxygen ion is attracted to a cation having relatively strong bonding strength. Therefore, it is considered that bonding between the oxygen ion and a cation having relatively weak bonding strength is further weakened, and as a result, the portion preferentially dissociates when deforming, and a chain structure becomes more flexible in a deformation direction.

In the case where the present glass contains a large amount of an alkali metal oxide containing an alkali metal cation having small bonding strength to an oxygen ion, anisotropy tends to enhance. The alkali metal oxide containing the alkali metal cation having the smallest bonding strength to an oxygen ion is $Cs_2O$ having the largest cationic radius and therefore having the smallest electric field intensity, and next is $Rb_2O$, and then $K_2O$, $Na_2O$ and $Li_2O$ in this order. However, a raw material of $Rb_2O$ is expensive. Therefore, considering cost, it is preferred to contain three kinds of alkali metal oxides of $Cs_2O$, $K_2O$, and $Na_2O$, for enhancing anisotropy.

In the present glass, it is preferred that a molar ratio of the contents of arbitrary two kinds of alkali metal oxides is 2 or less in order to enhance anisotropy. That is, when the content of an alkali metal oxide having the largest content in two or more kinds of alkali metal oxides is taken as $x_1$ and the content of an alkali metal oxide having the smallest content is taken as $x_2$, the molar ratio $x_1/x_2$ of the contents is preferably 2 or less, more preferably 1.5 or less, and most preferably 1, in order to enhance anisotropy. It is most preferred in the present glass that molar ratios of alkali metal oxides contained are all the same. The reason for this is considered that the probability that different alkali metal ions are adjacently present in a glass structure becomes high, and as a result, a chain glass structure becomes easy to fluidize. In the portion at which different cations are adjacently present, it is considered that an oxygen ion is attracted to a cation having relatively strong bonding strength, bonding between the oxygen ion and a cation having relatively weak bonding strength is further weakened, the portion selectively dissociates when deforming, and a straight chain becomes easy to fluidize toward a deformation direction.

To enhance water resistance, the present glass contains at least one of polyvalent element oxides other than $P_2O_5$ in addition to the above-described components. It is considered that cations of polyvalent elements can prevent penetration of water into a glass structure by enhancing bonding strength between chain structures of a metaphosphate glass. The total content of polyvalent element oxides in the present glass composition is 0.1% or more, and preferably 1% or more, in order to enhance water resistance. On the other hand, it is considered that if bonding strength between chain structures is too high, anisotropy becomes difficult to obtain. Therefore the total content of polyvalent element oxides in the present glass composition is 20% or less, preferably 10% or less, more preferably 5% or less, and still more preferably 3% or less, in order to enhance anisotropy.

Examples of the polyvalent element oxides include MgO, CaO, SrO, BaO, ZnO, $B_2O_3$, $Al_2O_3$, $Fe_2O_3$, and $SiO_2$. The present glass may contain two or more kinds of polyvalent element oxides other than $P_2O_5$.

Divalent element oxides such as MgO, CaO, SrO, BaO, and ZnO has relatively small electric field intensity and electronegativity, and exhibit relatively small bonding strength to an oxygen ion. Therefore, they can improve water resistance while enhancing anisotropy, and thus, they are preferred. BaO and the like having a large cationic radius are more preferred in that anisotropy becomes easy to enhance.

$B_2O_3$, $Al_2O_3$, $Fe_2O_3$, and $SiO_2$ contain cations that are considered to form a crosslinking structure between those and a phosphorus ion through an oxygen ion. These oxides that can form the crosslinking structure can greatly improve water resistance of the glass by the addition of a small amount thereof, and therefore they are preferred.

It is more preferred that the present glass contains a trivalent element oxide as a polyvalent element oxide in order to enhance water resistance.

It is preferred that the present glass contains $Al_2O_3$ in that anisotropy can be enhanced and water resistance can be improved. In the case of containing $Al_2O_3$, the content thereof is preferably 0.1% or more, and more preferably 1% or more, in order to improve water resistance. The content of $Al_2O_3$ is preferably 10% or less, and more preferably 5% or less, in order to enhance anisotropy.

The present glass can be manufactured by a method of elongating a glass having the above-described composition in one direction under the state of heating the glass to a deformation temperature $T_1$ that is slightly higher than a glass transition point Tg, and cooling the glass to the vicinity of room temperature in the elongated state. The ratio $T_1/Tg$ is preferably larger than 1, more preferably 1.03 or larger and further preferably 1.05 or larger from the viewpoint of achieving easy elongation. Further, the ratio $T_1/Tg$ is preferably 1.2 or smaller, more preferably 1.15 or smaller and further preferably 1.1 or smaller from the viewpoint of enhancing anisotropy. At the temperature in the vicinity of the glass transition point Tg, a chain structure by $P_2O_5$ is formed and the glass has fluidity to a certain extent. Therefore, a chain glass structure arranged in one direction can be obtained by elongating the glass in one direction at the temperature in the vicinity of the glass transition point.

The present glass contracts at a use temperature $T_2$ that is higher than the glass transition point Tg. That is, the present glass shows entropic elasticity. According to the studies by the present inventors, the present glass has a linear correlation between a size of contraction by entropic elasticity and a size of birefringence.

The use temperature $T_2$ is set higher than the glass transition point Tg in order to increase elasticity. The use temperature $T_2$ is preferably Tg+50° C. or lower, and more preferably Tg+40° C. or lower, in order to maintain anisotropy.

The glass transition point Tg of the present glass is typically from about 200° C. to 300° C. Therefore, according to the present invention, an anisotropic glass exhibiting entropic elasticity in a temperature region of from about 200 to 350° C. can be obtained.

EXAMPLES

The present invention is described in detail below by reference to examples, but the present invention should not be construed as being limited to those Examples. Examples 1 to 4 are working examples and Examples 5 and 6 are comparative examples.

(Preparation of Metaphosphate Glass)

Glass raw materials such as lithium metaphosphate, sodium metaphosphate, potassium metaphosphate, cesium carbonate, aluminum metaphosphate, and ammonium dihydrogenphosphate were blended and mixed such that 30 g of the respective glasses having compositions shown in Table 1 are obtained. Some of the glass composition in which the contents of components are represented by mol % in Table 1 is that the sum of the contents is not 100 because these contents are described by rounding off. For example, in the glass composition of Example 1, the sum of alkali metal oxides is 41%, and $Na_2O$, $K_2O$ and $Cs_2O$ are contained in equimolar amounts. However, each content is described as 13.7 by rounding off to one decimal place, and therefore, the sum is 100.1.

The mixture of the glass raw material powders was placed in a platinum crucible, the crucible was placed in an electric furnace maintained at 1,000° C., and the mixture was melted for 1 hour.

The crucible was taken out of the electric furnace, and the resulting molten glass was molded into a rod shape by a method of inserting a quartz glass rod when the molten glass in the crucible reached moldable viscosity, and gradually pulling up the rod, followed by cutting the pulled-up glass into an appropriate length. The rod-shaped sample obtained had a diameter of from 450 μm to 850 μm. The rod-shaped sample was processed by rounding both ends thereof such that a weight can be hung therefrom, to thereby prepare a dumbbell-shaped sample having a length excluding the rounded parts of about 100 mm. The dumbbell-shaped sample obtained and the remaining rod-shaped sample were stored in heptane in order to avoid a reaction with moisture in the air.

A part of the rod-shaped sample was pulverized, and from 30 mg to 40 mg thereof was placed in a platinum cell, melted at 1,000° C. and then cooled to room temperature. The obtained platinum cell containing the glass was set in a differential thermal analyzer (DTA), and a DTA curve was obtained at a temperature rising rate of 10° C./min. A glass transition point Tg (° C.) was obtained from the DTA curve. According to this method, an error derived by pulverization can be eliminated, and as a result, a glass transition point can be correctly measured.

(Preparation of Anisotropic Glass)

The dumbbell-shaped sample was held in a vertical tube furnace maintained at a deformation temperature $T_1$ that is slightly higher than a glass transition point. A weight was loaded at a lower part of the dumbbell-shaped sample to apply a load, and the sample was elongated for about 2 minutes to 5 minutes, thereby preparing a sample for anisotropy measurement. Deformation temperature $T_1$ (unit: ° C.), mass of the weight (unit: g), elongation time (unit: min), and length of the sample excluding rounded parts before and after elongation (unit: mm) are shown in Table 1.

(Evaluation of Anisotropy)

Regarding the sample for anisotropy measurement obtained by elongation, retardation R (unit: nm) at 546 nm was measured by using a sensitive tint plate, a quartz wedge plate and a Senarmont compensator under a polarizing microscope. A birefringence Δn (unit: $10^{-6}$) was calculated from the retardation R and a thickness d (unit: mm) of a sample by the following formula (1).

$$\Delta n = \frac{546}{180} \cdot \frac{R}{d} \tag{1}$$

(Evaluation of Water Resistance)

The rod-shaped sample was cut into an appropriate length, its mass was measured, and the sample was dipped in water at 18° C. for 1 hour. Mass loss (unit: mass %) before and after dipping was obtained. The results are shown in the Table. The mass loss of "100%" means that the sample was dissolved and disappeared during the dipping. The mass loss is preferably 20% or less, and more preferably 1% or less.

TABLE 1

| mol % | Ex. 1 | Ex. 2 | Ex. 3 | Ex. 4 | Ex. 5 | Ex. 6 |
|---|---|---|---|---|---|---|
| $P_2O_5$ | 54.5 | 54.5 | 50 | 50 | 50 | 50 |
| $Li_2O$ | — | — | — | 8.3 | — | 12.5 |
| $Na_2O$ | 13.7 | | 13.7 | 8.3 | 16.7 | 12.5 |
| $K_2O$ | 13.7 | 20.5 | 13.7 | 8.3 | 16.7 | 12.5 |
| $Cs_2O$ | 13.7 | 20.5 | 13.7 | 8.3 | 16.7 | 12.5 |
| $Al_2O_3$ | 4.5 | 4.5 | — | — | — | — |
| MgO | — | — | 9 | — | — | — |
| BaO | — | — | — | 16.7 | — | — |
| Sum of alkalis | 41 | 41 | 41 | 33.3 | 50 | 50 |
| Glass transition point Tg (° C.) | 239.8 | 279.6 | 236.4 | 269.7 | 190.0 | 209.0 |

TABLE 1-continued

| mol % | Ex. 1 | Ex. 2 | Ex. 3 | Ex. 4 | Ex. 5 | Ex. 6 |
|---|---|---|---|---|---|---|
| Deformation temperature $T_1$ (° C.) | 250.0 | 290.0 | 240.0 | 284.0 | 205.0 | 230.0 |
| $T_1$/Tg | 1.04 | 1.04 | 1.02 | 1.05 | 1.08 | 1.10 |
| Weight (g) | 842.0 | 241.0 | 341.0 | 341.0 | 542.0 | 392.0 |
| Time (min.) | 5.0 | 5.0 | 5.0 | 2.0 | 2.0 | 2.0 |
| Length before elongation (mm) | 100.5 | 102.0 | 97.5 | 101.0 | 101.0 | 102.0 |
| Length after elongation (mm) | 108.0 | 135.0 | 101.5 | 105.5 | 117.0 | 117.0 |
| Birefringence ($10^{-6}$) | 43.0 | 77.0 | 42.0 | 190.5 | 896.0 | 837.0 |
| Mass before dipping | 103.8 | 102.6 | 114.2 | 136.3 | 105.8 | 120.5 |
| Mass loss (mass %) | 0.0 | 19.3 | 0.4 | 0.3 | 100.0 | 100.0 |

Examples 1 to 4 are examples of the glass of the present invention, and exhibit relatively good water resistance. Furthermore, those glasses show anisotropy, and it is therefore considered that those glasses show entropic elasticity.

Examples 5 and 6 are examples of anisotropic glass that does not contain polyvalent element oxides other than $P_2O_5$, and those glasses are poor in water resistance.

While the present invention has been described in detail and with reference to specific embodiments thereof, it will be apparent to one skilled in the art that various changes and modifications can be made therein without departing from the spirit and scope thereof.

The present application is based on a Japanese patent application (Patent Application No. 2015-118654) filed on Jun. 11, 2015, and the contents thereof are herein incorporated by reference.

INDUSTRIAL APPLICABILITY

The anisotropic glass of the present invention shows elasticity in a temperature region of from about 200° C. to 350° C. Therefore, it is considered that the anisotropic glass of the present invention can be utilized in, for example, a vibration-proofing material or sealing material in the mechanism in which vibration is increased at high temperature.

What is claimed is:

1. An anisotropic glass comprising, in terms of mol % on the basis of oxides, $P_2O_5$ in a content of from 45 mol % to 57 mol %, three or more alkali metal oxides selected from the group consisting of $Li_2O$, $Na_2O$, $K_2O$, $Rb_2O$, and $Cs_2O$ in a total content of from 30 mol % to 54 mol %, and at least one polyvalent element oxide other than $P_2O_5$ in a total content of from 0.1 mol % to 20 mol %, and having a birefringence of $30\times10^{-6}$ or more.

2. The anisotropic glass according to claim 1, comprising four or more alkali metal oxides selected from the group consisting of $Li_2O$, $Na_2O$, $K_2O$, $Rb_2O$, and $Cs_2O$.

3. The anisotropic glass according to claim 1, wherein the content of an alkali metal oxide having the largest content in the three or more alkali metal oxides selected from the group consisting of $Li_2O$, $Na_2O$, $K_2O$, $Rb_2O$, and $Cs_2O$ is taken as $x_1$ and the content of an alkali metal oxide having the smallest content is taken as $x_2$ and a molar ratio $x_1/x_2$ of the contents is 2 or less.

4. The anisotropic glass according to claim 2, comprising $Na_2O$, $K_2O$ and $Cs_2O$.

5. The anisotropic glass according to claim 1, comprising, as the polyvalent element oxide other than $P_2O_5$, at least one selected from the group consisting of MgO, CaO, SrO, BaO, ZnO, $B_2O_3$, $Al_2O_3$, $Fe_2O_3$, and $SiO_2$.

6. The anisotropic glass according to claim 5, comprising $Al_2O_3$ in a content of from 0.1 mol % to 10 mol %.

7. The anisotropic glass according to claim 3, wherein the molar ratio $x_1/x_2$ is 1.5 or less.

8. The anisotropic glass according to claim 1, comprising, as the polyvalent element oxide other than $P_2O_5$, at least two selected from the group consisting of MgO, CaO, SrO, BaO, ZnO, $B_2O_3$, $Al_2O_3$, $Fe_2O_3$, and $SiO_2$.

9. The anisotropic glass according to claim 1, wherein the three or more alkali metal oxides are $Cs_2O$, $K_2O$, and $Na_2O$.

10. The anisotropic glass according to claim 1, wherein the content of $P_2O_5$ is 48 mol % to 55 mol %.

11. The anisotropic glass according to claim 1, wherein the content of $P_2O_5$ is 49 mol % to 52 mol %.

12. The anisotropic glass according to claim 1, wherein the total content of the three or more alkali metal oxides is 35 mol % to 50 mol %.

13. The anisotropic glass according to claim 1, wherein the total content of the three or more alkali metal oxides is 40 mol % to 49 mol %.

14. The anisotropic glass according to claim 1, wherein the total content of the polyvalent element oxide other than $P_2O_5$ is 1% to 10%.

15. The anisotropic glass according to claim 1, wherein the polyvalent element oxide other than $P_2O_5$ is BaO.

16. The anisotropic glass according to claim 1, wherein the content $Al_2O_3$ is 1 mol % to 5 mol %.

* * * * *